Oct. 17, 1950      G. LAUGHEAD ET AL      2,526,371
AIRPLANE FLIGHT INSTRUCTION DEVICE
Filed March 5, 1947      3 Sheets-Sheet 1
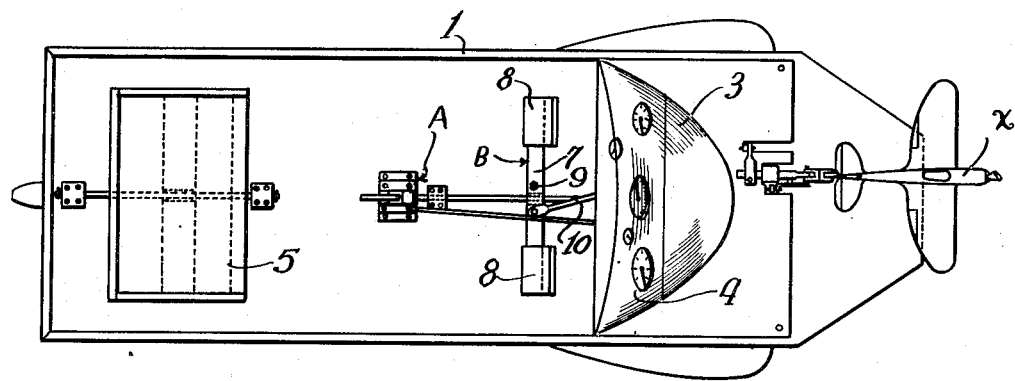
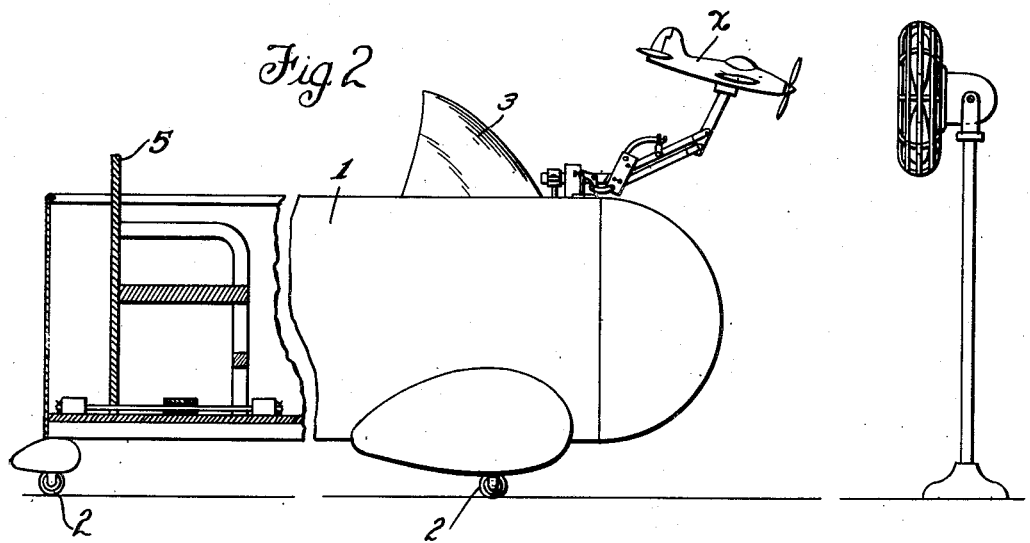
Inventors:-
Gordon Laughead,
Oscar H. Anderson
By Frau. D. Tifft Atty.

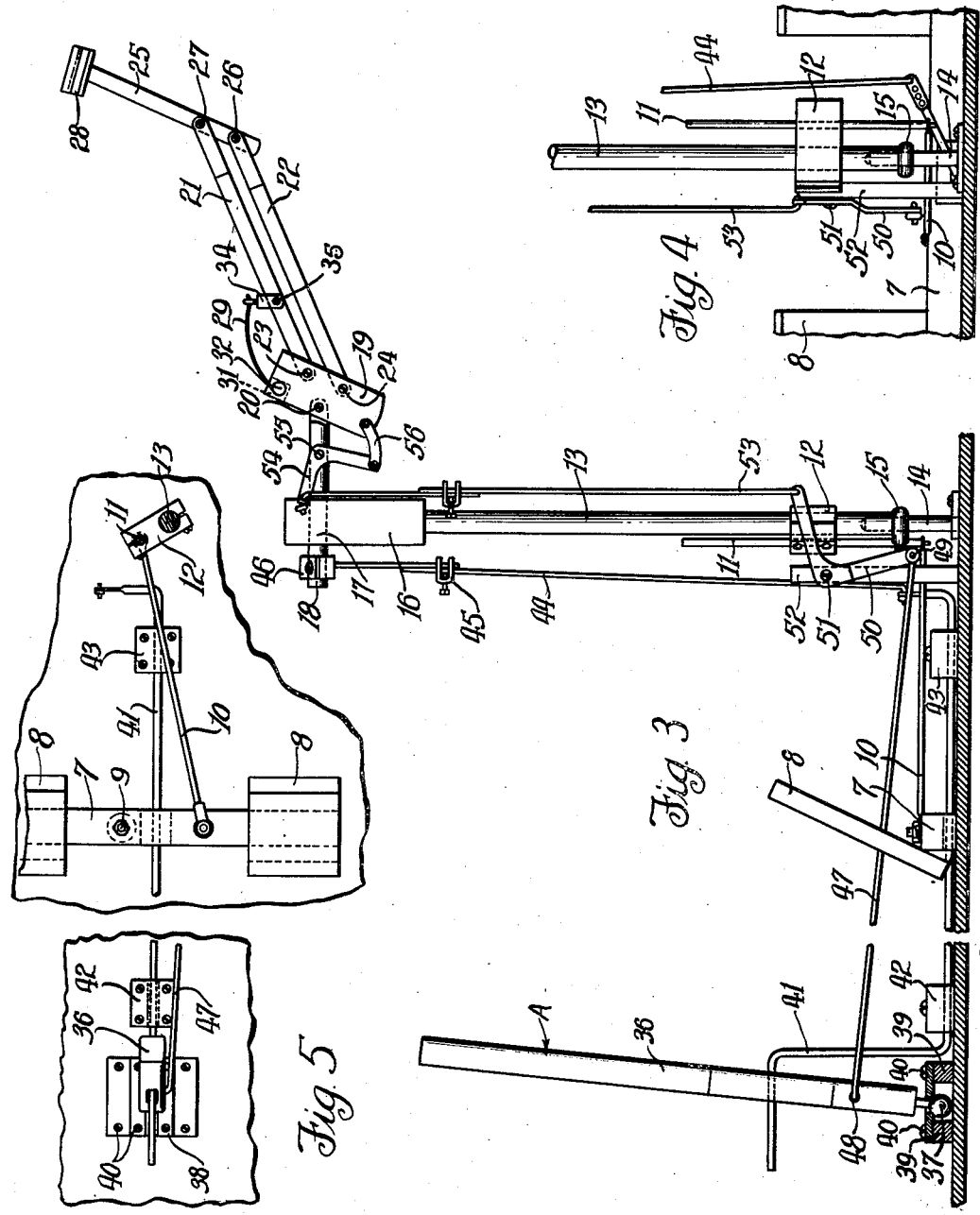

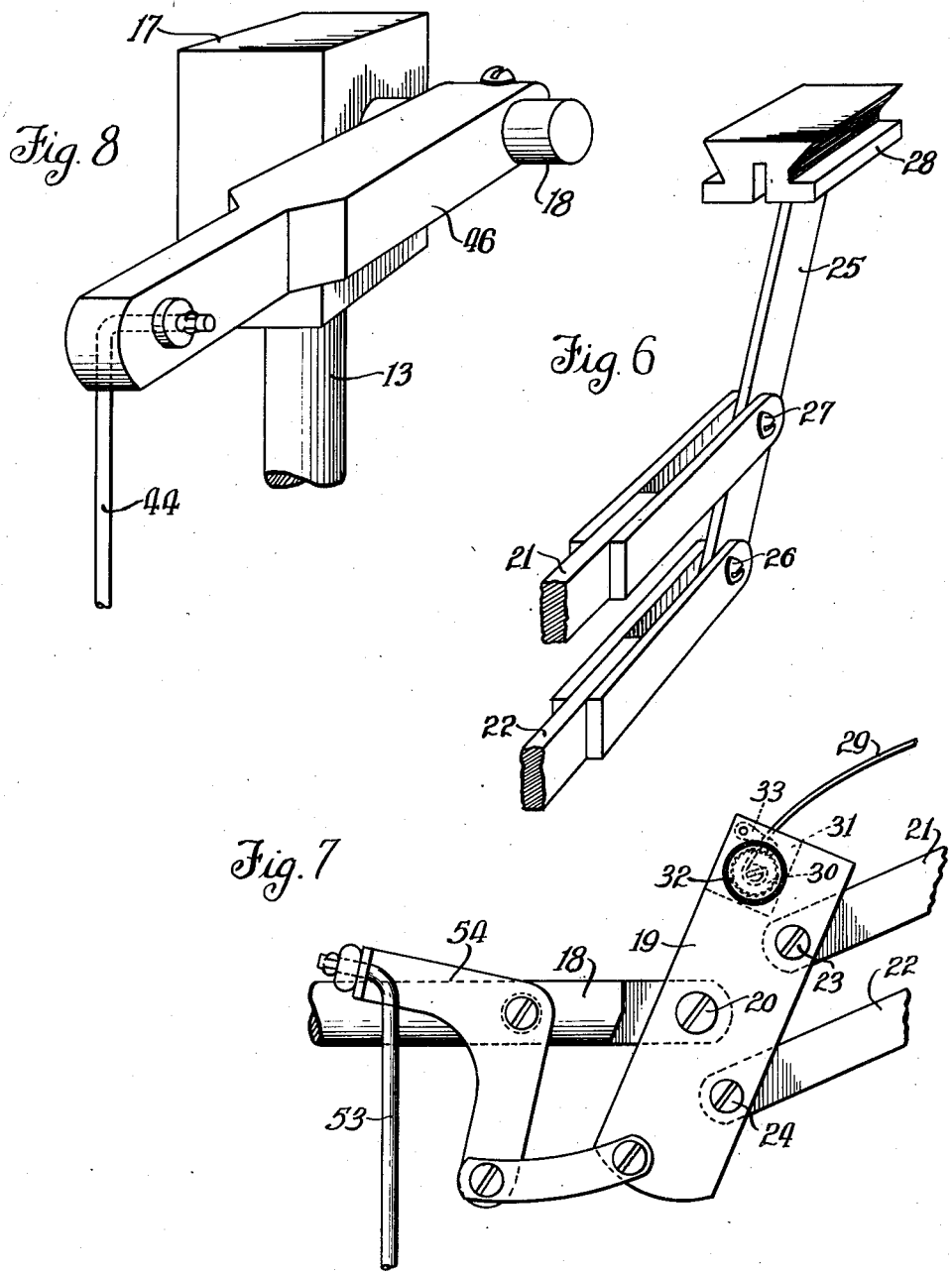

Patented Oct. 17, 1950

2,526,371

UNITED STATES PATENT OFFICE 2,526,371

AIRPLANE FLIGHT INSTRUCTION DEVICE

Gordon Laughead and Oscar H. Anderson, Grand Haven, Mich., assignors to Gordon Laughead Company, Grand Haven, Mich., a corporation of Michigan Application March 5, 1947, Serial No. 732,500

8 Claims. (Cl. 35—12)

This invention relates to airplane flight instruction devices, and while the adaptation disclosed herein is designed for children's use, by enlarging its cockpit and making other slight modifications in the general construction it may well be used in pre-flight training of adults.

An object of our invention is to provide a preflight training device having standard controls which impart to a toy airplane suspended in front and above the fuselage the approximate flight maneuver that would take place in a standard airplane upon similar actuation of the controls by the pilot.

With the above and other objects in view, the invention may be said to comprise the apparatus as illustrated in the accompanying drawings and hereinafter described and particularly set forth in the appended claims, together with such variations and modifications thereof as will be apparent to one skilled in the art to which the invention appertains.

Reference should be had to the accompanying drawings, forming a part of their specifications, in which:

Fig. 1 is a top plan view of our flight instruction apparatus.

Fig. 2 is a fragmentary contracted side elevational view with a portion of the side wall of the fuselage broken away to disclose the seating arrangement for the operator.

Fig. 3 is a fragmentary view of the control system utilized.

Fig. 4 is a fragmentary view illustrating the mounting of a portion of the control system.

Fig. 5 is a top fragmentary view partially in plan and partially in section of the stick and rudder controls mounted on the floor of the fuselage.

Fig. 6 is a fragmentary detail view of the airplane mounting fixture and attached actuating arms.

Fig. 7 is a fragmentary side view of a part of the control system; and

Fig. 8 is another fragmentary view of a part of the control system.

The apparatus consists of a fuselage 1 mounted on casters 2 to permit mobility of the unit. A transparent plastic windshield 3 is affixed to and over the front end of the fuselage under which an instrument panel 4 is positioned. An adjustable seat 5 is placed in the rear interior of the fuselage, the adjustment mechanism being of any standard construction permitting adjustment of the seat forwardly and rearwardly to accommodate short and long legged individuals.

A small model airplane X having fixed control surfaces is flexibly suspended forward of and above the front end of the fuselage. Movement is imparted to the small plane through the medium of an air blast from a standard electric fan as indicated in Figure 2 positioned in front of the fuselage and so adjusted that the blast from the fan will play upon the air foil of the plane. The fan blast imparts lift to the air foil surfaces of the airplane and the manual control system (to be specifically described hereinafter) imparts maneuverability to the plane directly responsive to movement of the controls. The movement of the controls (which are similar to those employed in standard aircraft) will cause the small airplane to execute the approximate maneuvers of standard aircraft when its controls are moved correspondingly.

*The control system*

The control system includes a stick assembly A and rudder pedal assembly B, the coordinated action of which controls will impart flight maneuver to the model airplane X.

The rudder assembly comprises crossbar 7 and foot pedals 8 which assembly is fulcrumed at 9. A rod 10 is fulcrumed at one end to the bar 7 and at the other to a rod 11 which in turn is clamped in a double clamp connector means 12, the opposite end of which is clamped to a mast 13. The relation of the fulcrum of the rudder bar and the rod fulcrum being such that actuation of the rudder will cause rod 10 (acting on connector 12) to impart rotative movement to the mast 13 which in turn is rotatably mounted on a spindle bearing 14 fastened to the floor of the fuselage. An adjustable collar 15 is provided permitting lowering or raising of mast 13 as required.

A rectangularly shaped block 16 is affixed to the top of the mast 13 and a circular hole is drilled therethrough at 17 to take and support a rotatable rod 18. The outwardly extending slotted end of rotatable rod 18 is fulcrumed to a supporting member 19 and is movably affixed thereto through the medium of a pin 20. Parallel spaced supporting and actuating arms 21 and 22, both slotted at their extremities are movably affixed to the forwardly extending edge of supporting member 19 through the medium of pins 23 and 24 and to the lower end of plane carrier arm 25 by pins 26 and 27. To the upper end of the plane carrier arm 25 is affixed a connector member 28 (see Fig. 6) which in the preferred form is wedge-shaped as to permit it to engage a corresponding female wedge-shaped attaching member (not shown) affixed to the under side of the plane fuselage. The plane connector members are so constructed and arranged as to permit ready removal and substitution of different types of model planes.

An adjustable steel spring arm 29 flexibly supports the extended plane supporting and actuating assembly. The inner end of the spring is affixed to a gear 30 rotatably mounted in a slotted portion of cam member 19 which slot forms a gear case 31. The opposed ends of said gear are reduced and extend through opposed orifices in the gear case 31 thus providing support for said gear. One of the reduced ends of said gear extends through its supporting orifice and attached thereto is a winding handle 32. A locking pawl 33 mounted within the gear casing provides means for controlling the movement of the gear. The opposite end of spring supporting member 29 is affixed to a hangar member 34 which is fulcrumed to arm 21 through the medium of pin 35. The spring 29 is of approximate clock-spring dimension and specification, and being affixed to one side of gear 30 when gear 30 is rotated by rotation of handle 32 more or less tension is given to spring 29 thus exerting more or less lift to the plane supporting assembly, the purpose of which will be explained hereinafter.

Movement of the rudder bar will through linkage heretofore described impart rotative movement to mast 13 and through linkage impart lateral movement to the extended plane-supporting assembly and thus to the plane itself. To provide for other changes of attitude of the plane, a stick assembly A is provided. The assembly consists of a stick 36 fulcrumed at its lower end through the medium of any standard ball and socket assembly. In the form shown, a spherical headed screw 37 is affixed to the lower extremity of the stick 36, the head of which is encompassed in a socket formed by a plate 38 having an orifice drilled therein to receive the shaft of the spherically headed screw. Said plate is suspended from and attached to the floor of the fuselage through the medium of blocks 39 and screws 40.

The lower portion of stick 36 is slotted to receive the end of actuating rod 41 which is rotatably affixed to the floor of the fuselage by clamping members 42 and 43. The rod 41 is so formed that movement of the stick 36 sidewise imparts like movement to its opposite end which is fulcrumed to linkage member 44 adjustable (as to length) through the medium of a connector clamp 45. The upper end of linkage member 44 is fulcrumed to a crank arm 46 the opposite end of which is clamped to the inner end of rod 18 (see Fig. 8). Movement of the stick sidewise will through the connecting linkage hereinabove described impart rotation movement to rod 18 and the extending plane supporting members which in turn imparts lateral movement of the plane on its axis causing it to assume a banking maneuver position.

To impart climbing movement to the model plane, we employ actuating means comprising a rod 47, one end of which is bent at an angle of 90°, which end is adapted to pass through a hole 48 drilled in the stick directly below the slot through which the end of actuating rod 41 is inserted. The opposite end of said rod is bent at a 90° angle and protrudes through a hole 49 in L arm 50 pivotally affixed at 51 to an upstanding support member 52 which in turn is affixed to the floor of the fuselage. The opposite end of the L arm 50 is drilled to receive one end of an adjustable actuating rod 53 the other end being bent at a 90° angle to engage an aperture in the offset end of L arm 54. L arm 54 is affixed to rod 18 at its fulcrum point through the medium of a screw 55. The other end of L arm 54 is coupled to supporting member 19 by a strap 56. Thus, movement of the stick forwardly or rearwardly will through actuation imparted to the L arms 54 and 50, rods 47 and 53, supporting member 19, and arms 21 and 22 cause the plane carrier arm to move in an arc thus causing the plane to assume a climbing or gliding attitude. The rate of climb or glide obviously is controlled by the degree of movement rearwardly or forwardly of the stick.

The device functions as follows:

A standard electric fan is positioned in front of the fuselage and the blast therefrom is directed onto the air foil surfaces of the model airplane. The force of the blast (controlled through manual movement of the fan to or away from the airplane and/or increasing or decreasing the speed of the fan by means of its rheostat) must be sufficient to impart sufficient lift to the air foil of the airplane to cause it to raise to its neutral position (approximately one foot above the top of the windshield). Should the fan blast be insufficient to raise the airplane an adjustment should be made increasing the tension of the spring as to cause it to assist air blast from the fan in raising the airplane to neutral position. Likewise, if the fan blast pressure plus the spring tension is too great causing the airplane to rise above the neutral position, the tension on the spring should be reduced until it plus the fan blast supports the plane in neutral position.

Coordinated movement of the rudder and stick controls will cause the model airplane to execute practical all-primary flight maneuvers, and fault in execution of primary flight movements can be observed and corrected.

Obviously, there are many possible modifications of the structure illustrated within the scope and purview of our broad inventive concept and we do not wish to be limited except as indicated by the appended claims.

We claim:

1. A flight instruction device comprising in combination a fuselage section having a cockpit therein and standard airplane control mechanism in said cockpit, a model airplane located forwardly of said cockpit and mounted for vertical movement upwardly by the action of an airstream on the air foil surfaces of said model airplane and for movement about a vertical axis and a pair of rectangularly related horizontal axes, linkage means between said standard airplane control mechanism and the point of support for said model airplane providing movement of said model airplane in its entirety about said vertical and horizontal axes by manipulation of said standard airplane control mechanism.

2. A flight instruction device comprising a cockpit having therein a pilot seat and standard control mechanism for an airplane, a supporting member located in front of the said cockpit and mounted for movement about a vertical axis and about a pair of horizontal axes, all of said axes being rectangularly related to one another, linkage means between said standard control mechanism and said supporting member to provide selective movement of said supporting member about said horizontal and vertical axes by operation of said standard control mechanism, a pair of links each pivoted at one end of said supporting member at spaced points thereon and at the other end to a carrier arm at spaced points thereon and a model airplane mounted on said carrier arm.

3. A flight instruction device comprising a cockpit having therein a pilot seat and standard control mechanism for an airplane, a supporting member located in front of the said cockpit and mounted for movement about a vertical axis and about a pair of horizontal axes, all of said axes being rectangularly related to one another, linkage means between said standard control mechanism and said supporting member to provide selective movement of said supporting member about said horizontal and vertical axes by operation of said standard control mechanism, a pair of links each pivoted at one end of said supporting member at spaced points thereon and at the other end to a carrier arm at spaced points thereon and a model airplane mounted on said carrier arm, the supporting member, the said pair of links and the said carrier arm comprising a 4-bar linkage by means of which the model airplane is movable in a single plane with respect to said supporting member, and counter-balancing means associated with said 4-bar linkage resisting movement of said model airplane with respect to said supporting member due to force of gravity.

4. A flight instruction device comprising a cockpit having therein a pilot seat and standard control mechanism, a supporting member located in front of said cockpit and mounted for movement about a vertical axis and a pair of horizontal axes, all of said axes being rectangularly related, linkage means between said standard control mechanism and said supporting member to provide selective movement of said supporting member about said horizontal and vertical axes by operation of said standard control mechanism, parallel links each pivoted at one end to said supporting member at spaced points thereon, the other ends of said parallel links being pivotally connected to a carrier arm at spaced points thereon and a model airplane mounted on said carrier arm.

5. In a flight instruction device comprising a fuselage section having a cockpit therein and standard control mechanism for an airplane in said cockpit and a model airplane movably mounted forwardly of said cockpit and blower means to direct an air stream at said model airplane, a supporting member located adjacent the forward end of said fuselage section and mounted for movement about a vertical axis and a pair of rectangularly related horizontal axes, linkage means between said standard control mechanism and said supporting member providing selective movement of said supporting member about said horizontal and vertical axes by manipulation of said standard control mechanism, a pair of links each pivoted at one end to said supporting member and at the other end to a carrier arm, a model airplane mounted on said carrier arm, movement of the 4-bar linkage comprising said supporting member, said pair of links and said carrier arm producing a change in the angle of attack of said model airplane whereby the action of said airstream on said model airplane tends to raise the model airplane.

6. In a flight instruction device, in combination, a fuselage section having a cockpit therein with standard airplane controls in said cockpit, a blower means located forwardly of said fuselage section to direct an airstream towards said fuselage section, a supporting member located forwardly of said cockpit and mounted for movement about a vertical axis and a pair of rectangularly related horizontal axes, linkage means between said supporting member and said standard airplane controls for selective movement of said supporting member about said vertical and horizontal axes, 4-bar linkage means including said supporting member supporting a model airplane in said airstream for movement in a single plane relative to said supporting member, movement of said 4-bar linkage means producing a change in the angle of attack of said model airplane whereby the action of said airstream on said model airplane tends to raise said model airplane with respect to said supporting member.

7. In a flight instruction device, in combination, a fuselage section having a cockpit therein with standard airplane controls in said cockpit, a blower means located forwardly of said fuselage section to direct an airstream towards said fuselage section, a supporting member located forwardly of said cockpit and mounted for movement about a vertical axis and a pair of rectangularly related horizontal axes, linkage means between said supporting member and said standard airplane controls for selective movement of said supporting member about said vertical and horizontal axes, 4-bar linkage means including said supporting member supporting a model airplane in said airstream for movement in a single plane relative to said supporting member, movement of said 4-bar linkage means producing a change in the angle of attack of said model airplane whereby the action of said airstream on said model airplane tends to raise said model airplane with respect to said supporting member, and adjustable counterbalance means associated with said 4-bar linkage means resisting downward movement of said model airplane relative to said supporting member.

8. In a flight instruction device, in combination, a fuselage section having a cockpit therein with standard airplane controls in said cockpit, a blower means located forwardly of said fuselage section to direct an airstream towards said fuselage section, a supporting member located forwardly of said cockpit and mounted for movement about a vertical axis and a pair of rectangularly related horizontal axes, linkage means between said supporting member and said standard airplane controls for selective movement of said supporting member about said vertical and horizontal axes, 4-bar linkage means including said supporting member supporting a model airplane in said airstream for movement in a single plane relative to said supporting member, movement of said 4-bar linkage means producing a change in the angle of attack of said model airplane whereby the action of said airstream on said model airplane tends to raise said model airplane with respect to said supporting member, and adjustable counterbalance means comprising a spring connected to said supporting member and another element of said 4-bar linkage resisting the force of gravity on said model airplane.

GORDON LAUGHEAD.
OSCAR H. ANDERSON.

REFERENCES CITED

The following references are of record in the file of this patent:

UNITED STATES PATENTS

| Number | Name | Date |
| --- | --- | --- |
| 1,927,938 | Huffman | Sept. 26, 1933 |
| 1,928,519 | Weisinger | Sept. 26, 1933 |
| 1,937,241 | Pardue | Nov. 28, 1933 |
| 1,939,047 | Gerhardt | Dec. 12, 1933 |
| 1,949,414 | Foulk | Mar. 6, 1934 |
| 1,973,592 | Weisinger | Sept. 11, 1934 |
| 2,305,207 | Tigerman | Dec. 15, 1942 |
| 2,336,711 | Barber | Dec. 14, 1943 |
| 2,409,238 | Barber | Oct. 15, 1946 |